US012449509B2

(12) United States Patent
Pavao Moreira et al.

(10) Patent No.: US 12,449,509 B2
(45) Date of Patent: Oct. 21, 2025

(54) HYBRID SUPPLY MONITORING SYSTEM FOR A RADAR DEVICE (71) Applicant: NXP B.V., Eindhoven (NL)

(72) Inventors: Cristian Pavao Moreira, Frouzins (FR); Matthias Rose, Helmond (NL); Thierry Mesnard, Plaisance du Touch (FR)

(73) Assignee: NXP B.V., Eindhoven (NL)

( * ) Notice: Subject to any disclaimer, the term of this patent is extended or adjusted under 35 U.S.C. 154(b) by 272 days.

(21) Appl. No.: 18/483,770

(22) Filed: Oct. 10, 2023

(65) Prior Publication Data

US 2024/0125897 A1 Apr. 18, 2024

(30) Foreign Application Priority Data

Oct. 17, 2022 (EP) .................................... 22306567

(51) Int. Cl.
*G01S 7/40* (2006.01)
*G01S 7/03* (2006.01)

(52) U.S. Cl.
CPC ............... *G01S 7/40* (2013.01); *G01S 7/032* (2013.01)

(58) Field of Classification Search
None
See application file for complete search history.

(56) References Cited

U.S. PATENT DOCUMENTS

| 5,498,972 | A | * | 3/1996 | Haulin | G01R 31/318577 324/754.03 |
| 5,664,089 | A | * | 9/1997 | Byers | G06F 11/1666 714/22 |
| 7,279,927 | B2 | * | 10/2007 | Falkowski | H02J 1/14 326/119 |
| 7,475,268 | B2 | * | 1/2009 | Clemo | G06F 1/30 713/340 |
| 9,442,184 | B2 | * | 9/2016 | Gehrels | G01S 7/40 |
| 9,823,296 | B2 | * | 11/2017 | Thanner | G01R 31/31701 |
| 10,359,469 | B2 | * | 7/2019 | Jin | G01R 31/3177 |
| 10,768,278 | B2 | * | 9/2020 | Subburaj | G01S 7/4021 |
| 2008/0191732 | A1 | * | 8/2008 | Pelgrom | G01R 19/28 324/750.3 |
| 2010/0275051 | A1 | * | 10/2010 | Searles | G06F 1/28 713/340 |
| 2014/0375327 | A1 | * | 12/2014 | Sievers | G01R 19/0084 324/503 |

(Continued)

*Primary Examiner* — Peter M Bythrow (57) ABSTRACT

An integrated circuit (IC) includes circuitry in a plurality of power domains for transmitting and/or receiving radar chirp frames and first and second monitoring systems for monitoring supply voltages of a first and a second subset of the plurality of power domains, respectively. The first subset is monitored outside of a time window during which a chirp frame is transmitted and/or received utilizing circuitry of the IC, and the second subset is monitored during the time window. The first monitoring system includes an output for an error signal indicating a supply voltage in the first subset does not comply with a first voltage parameter. The second monitoring system includes a unique monitoring circuit for each power domain in the second subset, and each unique monitoring circuit includes an output for an error signal indicating a supply voltage in the second subset does not comply with a second voltage parameter.

20 Claims, 6 Drawing Sheets (56) References Cited

U.S. PATENT DOCUMENTS

2017/0052219 A1* 2/2017 Knoth ................ G06F 11/3058
2021/0151978 A1* 5/2021 Uchman ................ G01L 27/00
2021/0405125 A1* 12/2021 Zimek ................ G01S 7/497
2022/0263440 A1* 8/2022 Kimura ................ H02J 7/0048
2024/0044955 A1* 2/2024 Chang ................ G01R 21/06

* cited by examiner

HYBRID SUPPLY MONITORING SYSTEM FOR A RADAR DEVICE

CROSS-REFERENCE TO RELATED APPLICATIONS

This application claims the priority under 35 U.S.C. § 119 of application Ser. No. 22/306,567.3, filed on 17 Oct. 2022, the contents of which are incorporated by reference herein.

BACKGROUND

Some radar systems are included in vehicles as part of automated driving assistance systems and used to assist in perception of environments around the vehicles. As radar devices used in safety-critical applications, the radar devices themselves must be monitored to ensure they are operating correctly. For example, the power domains of the radar devices must be monitored to ensure that the supply voltages provided to safety critical sub-circuits within the radar devices are within acceptable ranges of the specified values. However, monitoring supply voltages with some kinds of monitoring systems such as some software-based voltage monitors may disrupt normal operation of the radar devices, in that they cannot be used to continuously monitor supply voltages for safety-critical sub-circuits. Some hardware-based voltage monitors do not disrupt normal operation of radar devices but occupy a large amount of area on an integrated circuit.

SUMMARY

In accordance with a first aspect of the present disclosure, an integrated circuit is provided, comprising: circuitry for implementing at least one of transmitting and receiving radar chirp frames, wherein the circuitry is implemented in a plurality of power domains of the integrated circuit; a first monitoring system for monitoring supply voltages of a first subset of the plurality of power domains, wherein the first monitoring system monitors supply voltages of the first subset outside of a time window during which a radar chirp frame is transmitted or received utilizing circuitry of the integrated circuit, and wherein the first monitoring system includes an output to provide an error signal indicative of a supply voltage of a power domain in the first subset not being in compliance with a first specified voltage parameter; and a second monitoring system for monitoring supply voltages of a second subset of the plurality of power domains, wherein the second monitoring system includes a unique monitoring circuit for each power domain in the second subset, wherein each unique monitoring circuit includes an output to provide an error signal indicative of a supply voltage of the corresponding power domain not being in compliance with a second specified voltage parameter, wherein the second monitoring system monitors supply voltages of the second subset during the time window during which radar chirp frames are transmitted or received utilizing circuitry of the integrated circuit.

In one or more embodiments, wherein for a sequence of chirp frames being transmitted and received over time, the first monitoring system monitors supply voltages of the first subset between chirp frames in the sequence of chirp frames.

In one or more embodiments, the first monitoring system monitors supply voltages of the first subset by polling the power domains of the first subset to individually receive the corresponding supply voltages on a test bus.

In one or more embodiments, the first monitoring system includes an analog to digital converter for converting the supply voltages received on the test bus to digital values.

In one or more embodiments, the first monitoring system includes a memory for storing the first specified voltage parameter.

In one or more embodiments, the integrated circuit further comprises a system safety circuit including: inputs to receive the error signals from the unique monitoring circuits of the second monitoring system; an input to receive the error signal from the first monitoring system; and an output to provide a global error signal indicative of an error signal from the second monitoring system or an error signal from the first monitoring system.

In one or more embodiments, the first monitoring system monitors supply voltages of the first subset according to a safety process, wherein the safety process includes: receiving input supply voltages supplied to the power domains of the first subset; determining whether the input supply voltages comply with the first specified voltage parameter; receiving output supply voltages produced by the power domains of the first subset; and determining whether the output supply voltages comply with the first specified voltage parameter.

In one or more embodiments, the safety process further includes placing a power domain of the first subset in a loaded condition while the power domain supplies the output supply voltage to the first monitoring system for determining if the output supply voltage complies with the first specified voltage parameter.

In one or more embodiments, at least one power domain of the second subset includes circuitry of the first monitoring system.

In accordance with a second aspect of the present disclosure, an integrated circuit is provided, comprising: circuitry for implementing at least one of transmitting and receiving a radar chirp frame, wherein the circuitry is implemented in a plurality of power domains of the integrated circuit; and a voltage supply monitoring system including: a first monitoring sub-system for monitoring supply voltages of a first subset of the plurality of power domains, wherein the first monitoring sub-system monitors supply voltages of the first subset outside of a time window during which a radar chirp frame is transmitted or received utilizing circuitry of the integrated circuit; and a second monitoring sub-system for monitoring supply voltages of a second subset of the plurality of power domains including while a radar chirp frame is being transmitted or received utilizing circuitry of the integrated circuit, wherein at least one power domain of the second subset includes circuitry of the voltage supply monitoring system.

In one or more embodiments, for a sequence of chirp frames being transmitted and received, the first monitoring sub-system monitors supply voltages of each power domain of the first subset between chirp frames of the sequence of chirp frames.

In one or more embodiments, the first monitoring sub-system monitors supply voltages of the first subset by polling the power domains of the first subset to individually receive a supply voltage on a test bus from the power domain being polled.

In one or more embodiments, the first monitoring sub-system includes an analog to digital converter for converting the supply voltages received on the test bus to digital values.

In one or more embodiments, the first monitoring sub-system includes a memory for storing compliance thresholds for comparing with the received supply voltages on the test bus to determine if a received voltage is in compliance.

In one or more embodiments, the second monitoring sub-system includes a unique monitoring circuit for each power domain of the second subset, wherein each unique monitoring circuit includes an output to provide an error signal indicative of a supply voltage of the corresponding power domain not being in compliance with a specified voltage parameter.

In one or more embodiments, the first monitoring sub-system includes an output to provide an error signal indicative of a supply voltage of a power domain of the first subset not being in compliance with a specified voltage parameter.

In one or more embodiments, the first monitoring sub-system monitors supply voltages of the first subset according to a safety process, wherein the safety process includes: receiving input supply voltages supplied to the power domains of the first subset; determining whether the input supply voltages comply with specified voltage parameters; receiving output supply voltages produced by the power domains of the first subset; and determining whether the output supply voltages comply with specified voltage parameters.

In accordance with a third aspect of the present disclosure, a method is conceived, comprising: monitoring, by a first monitoring system of an integrated circuit, supply voltages of a first subset of a plurality of power domains of the integrated circuit by polling the power domains of the first subset to individually receive a supply voltage on a test bus from the power domain being polled, wherein the integrated circuit includes circuitry for implementing at least one of transmitting and receiving radar chirp frames, wherein no chirp frame is being transmitted or received using the circuitry of the integrated circuit during the monitoring; transmitting a radar chirp frame and receiving reflections, wherein at least one of the transmitting and receiving utilizes circuitry of the integrated circuit; and monitoring, by a second monitoring system of the integrated circuit, supply voltages of a second subset of the plurality of power domains, wherein the second monitoring system includes a unique monitoring circuit for each power domain of the second subset, wherein the monitoring supply voltages of the second subset occurs during the transmitting and receiving of radar chirp frames.

In one or more embodiments, monitoring the supply voltages of the first subset includes: receiving input supply voltages supplied to the power domains of the first subset; determining whether the input supply voltages comply with specified voltage parameters; receiving output supply voltages produced by the power domains of the first subset; and determining whether the output supply voltages comply with specified voltage parameters.

In one or more embodiments, monitoring the supply voltage of the first subset includes, for each power domain in the first subset: routing an input supply voltage supplied to the power domain to a shared analog test bus; converting the input supply voltage from the shared analog test bus into digital test input data; determining whether the digital test input data indicates the input supply voltage is in compliance with a first specified voltage parameter; in response to determining the digital test input data indicates the input supply voltage is not in compliance, generating an alert; causing a load to be placed on the power domain; routing an output supply voltage generated by the power domain to the shared analog test bus; converting the output supply voltage from the shared analog test bus into digital test output data; determining whether the digital test output data indicates the output supply voltage is in compliance with a second specified voltage parameter; and in response to determining the digital test output data indicates the output supply voltage is not in compliance, generating an alert.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

As described herein, the disclosed voltage monitoring system includes a first voltage monitoring sub-system and a second voltage monitoring sub-system. The first monitoring sub-system can continuously monitor a subset of the device power domains without disrupting normal device operation. The subset of power domains can include power domains needed for functional safety circuits and other critical circuits within a radar device. The second monitoring sub-system can monitor the remaining device power domains during a specified time period for the safety check by polling the power domains and individually receiving the supply voltages on a shared test bus.

In some embodiments, the second monitoring sub-system can also be used to perform other kinds of safety checks, such as receiver linearity and transfer function checks, transmitter to transmitter phase difference checks, and other voltage monitoring including bias voltages and bandgap voltages, for example. In some implementations, the first monitoring sub-system occupies more area than the second monitoring sub-system but can monitor the subset of the device power domains continuously without interrupting normal operation of the radar device. In some embodiments, the combination of the two types of monitoring sub-systems may ensure that the supply voltages for device safety are monitored continuously while the power domains not critical for device safety are monitored periodically, and the overall area occupied by the disclosed voltage monitoring system is reduced relative to a voltage monitoring system that includes hardware-based voltage monitors for every power domain in the radar device.

Figure 1A:
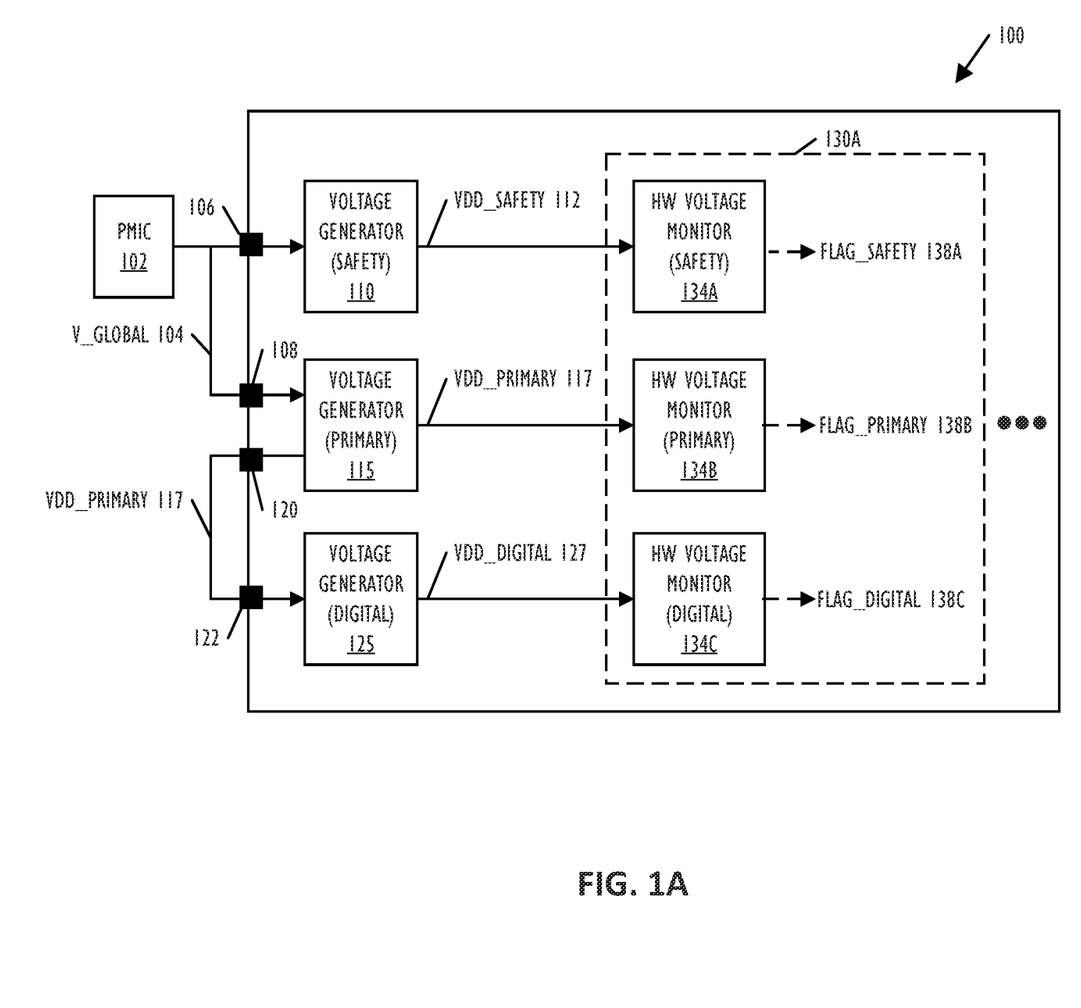
FIGS. 1A-B show, in block diagram form, an example radar device including a hybrid supply monitoring system, according to one embodiment.
Figure 1B:
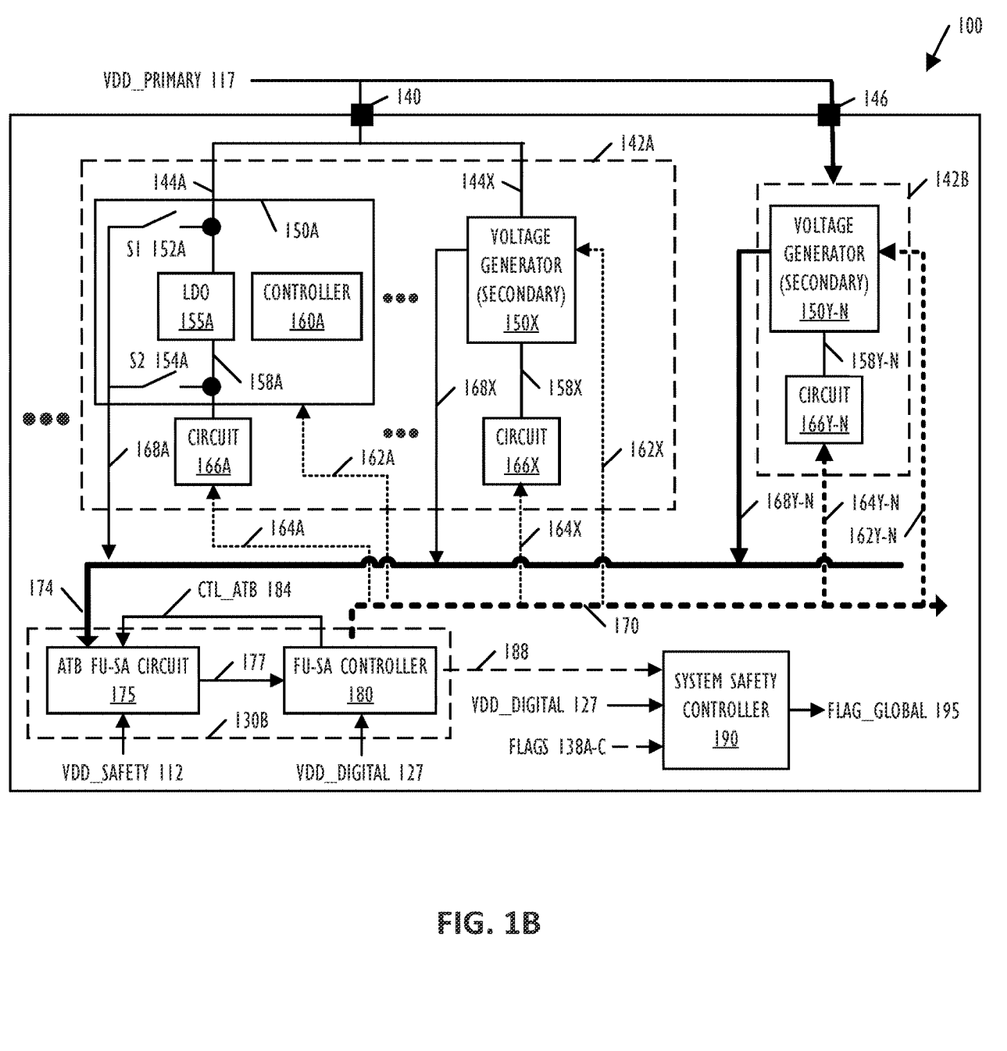

FIGS. 1A-B show, in block diagram form, an example radar device 100 including a hybrid supply monitoring system, according to one embodiment. The radar device 100 can be a frequency-modulated continuous wave (FMCW) radar system. The radar device 100 includes a plurality of voltage generators for a plurality of power domains, a hardware-based (HW) voltage monitoring system 130A, a software-based voltage monitoring system 130B, a system safety controller 190, and a plurality of radar sub-circuits 166A-N operating in the plurality of power domains. For example, as shown in FIG. 1A, an external power management integrated circuit (IC) (PMIC) 102 provides a global supply voltage V_global 104 to inputs 106 and 108 of the radar device 100. For example, V_global 104 can be a 3.3 volt (V) supply. A safety voltage generator 110 receives V_global 104 from input 106 and generates a safety supply voltage Vdd_safety 112 for functional-safety related circuits within the radar device 100, such as an analog test bus (ATB) functional-safety (FU-SA) circuit 175 shown in FIG. 1B. For example, the safety voltage generator 110 receives the 3.3 V V_global 104 and generates a 1.8 V Vdd_safety 112.

A primary voltage generator 115 receives V_global 104 from input 108 and generates a primary supply voltage Vdd_primary 117 for secondary voltage generators 150A-N in the sets 142A-B of power domains shown in FIG. 1B and a digital voltage generator 125 shown in FIG. 1A. For example, the primary voltage generator 115 receives the 3.3 V V_global 104 and generates a 1.5 V Vdd_primary 117. The primary voltage generator 115 outputs Vdd_primary 117 to an output 120 of the radar device 100, and Vdd_primary 117 is routed to inputs 122, 140, and 146 of the radar device 100. The digital voltage generator 125 receives Vdd_primary 117 from input 122 and generates a digital supply voltage Vdd_digital 127 for digital power domains such as for a FU-SA controller 180 and a system safety controller 190 shown in FIG. 1B. For example, the digital voltage generator 125 receives the 1.5 V Vdd_primary 117 and generates a 0.9 V Vdd_digital 127. The voltage generators 110, 115, and 125 can be any appropriate type of voltage generator, such as a voltage divider, and each of voltage generators 110, 115, and 125 can be a different type of voltage generator. Similarly, the voltages given are for illustration only, not by way of limitation.

The first, HW voltage monitoring system 130A includes three hardware voltage monitors: a safety voltage monitor 134A, a primary voltage monitor 134B, and a digital voltage monitor 134C. The safety voltage monitor 134A receives the safety supply voltage Vdd_safety 112 from the safety voltage generator 110 and outputs a flag FLAG_safety 138A in response to Vdd_safety 112 not being in compliance with a specified safety voltage parameter. For example, the safety voltage monitor 134A can be an over-voltage, under-voltage detection circuit that generates FLAG_safety 138A in response to Vdd_safety 112 being outside a specified range of voltages, such as in response to Vdd_safety 112 being five percent greater than or less than a specified value of Vdd_safety 112. The specified range of voltages can be chosen based on the specified operating range of Vdd_safety 112.

The primary voltage monitor 134B receives the primary supply voltage Vdd_primary 117 from the primary voltage generator 115 and outputs a flag FLAG_primary 138B in response to Vdd_primary 117 not being in compliance with a specified primary voltage parameter. For example, the primary voltage monitor 134B can be an over-voltage, under-voltage detection circuit that generates FLAG_primary 138B in response to Vdd_primary 117 being outside a specified range of voltages, such as in response to Vdd_primary 117 being seven percent greater than or less than a specified value of Vdd_primary 117. The specified range of voltages can be chosen based on the specified operating range of Vdd_primary 117.

The digital voltage monitor 134C receives the digital supply voltage Vdd_digital 127 from the digital voltage generator 125 and outputs a flag FLAG_digital 138C in response to Vdd_digital 127 not being in compliance with a specified primary voltage parameter. For example, the digital voltage monitor 134C can be an over-voltage, under-voltage detection circuit that generates FLAG_digital 138C in response to Vdd_digital 127 being outside a specified range of voltages, such as in response to Vdd_digital 127 being nine percent greater than or less than a specified value of Vdd_digital 127.

The hardware-based voltage monitors 134A-C can monitor the safety supply voltage Vdd_safety 112, the primary supply voltage Vdd_primary 117, and the digital supply voltage Vdd_digital 127 continuously throughout operation of the radar device 100, such that any fault condition that could cause errors in the supply voltages Vdd_safety 112, Vdd_primary 117, or Vdd_digital 127 is identified quickly and corrective action taken promptly. The HW voltage monitors 134A-C can be any appropriate type of voltage monitor, such as an over-voltage under-voltage monitor, and each of the HW voltage monitors 134A-C can be a different type of voltage monitor.

The system safety controller 190 shown in FIG. 1B receives the flags 138A-C from the HW voltage monitors 134A-C. The system safety controller 190 can include one or more microcontrollers, central processing unit (CPU) cores, digital signal processors, and the like, or any combination thereof. The term "controller" in the singular is used herein to refer to either a single or multiple of the microcontrollers, CPU cores, digital signal processors, application-specific integrated circuits, and the like, or any combination thereof comprised in the system safety controller 190.

In FIG. 1B, a first set 142A of power domains receive the primary supply voltage Vdd_primary 117 from the input 140 of the radar device 100 and a second set 142B of power domains receive the primary supply voltage Vdd_primary 117 from the input 146 of the radar device 100. The first set 142A of power domains includes secondary voltage generators 150A-X and corresponding radar circuits 166A-X, as indicated by the ellipsis between the secondary voltage generators 150A and 150X and the ellipsis between the radar circuits 166A and 166X. The second set 142B of power domains includes secondary voltage generators 150Y-N and corresponding radar circuits 166Y-N. As used herein, the radar device 100 includes a number N of secondary voltage generators 150A-N and a corresponding N radar circuits 166A-N across the first and second sets of power domains 142A-B. The labels X and Y are used to indicate particular intermediates between 150B and 150N based on the implementation. For example, the radar device 100 includes 20 secondary voltage generators 150A-T and 20 radar circuits 166A-T. The first set 142A can include the secondary voltage generators 150A-J and radar circuits 166A-J, and the second set 142B can include the secondary voltage generators 150K-T and radar circuits 166K-T.

The secondary voltage generators 150A-N receive Vdd_primary 117 and generate secondary voltages 158A-N for the power domains of radar circuits 166A-N. For example, the secondary voltage generator 150A can generate a 0.9 V secondary voltage 158A, and the secondary voltage generator 150B, not shown, or the secondary voltage generator 150X can generate a 1.5 V secondary voltage 158B or 158X. The radar circuits 166A-N can include circuits used for the performance of radar operations, such as crystal controlled clock oscillator circuits, phase-locked loops, sensors, transmitters, receivers, chirp generators, signal processing circuits, and the like. The secondary voltage generators 150A-N can include any appropriate kind of voltage generator, such as a voltage divider, a voltage regulator or a low-voltage dropout (LDO) regulator.

The example secondary voltage generator 150A in the first set 142A shown in detail receives the input voltage 144A and outputs the secondary voltage 158A. The voltage generator 150A includes switches S1 152A and S2 154A, an LDO 155A, and a controller 160A. The controller 160A can include digital control logic and a communication interface. For example, the controller 160A can include combinatory logic such as digital gates and a standardized or customized communication interface such as a serial peripheral interface. The LDO 155A receives the input voltage 144A and generates the secondary voltage 158A The controller 160A causes the switches S1 152A and S2 154A to open and close based on a control signal 162A from the FU-SA controller 180. The FU-SA controller 180 can include one or more microcontrollers, CPU cores, digital signal processors, combinatory logic, and the like, or any combination thereof. For example, during a first safety check for common cause failures at the inputs of the secondary voltage regulators 150A-N, the FU-SA controller 180 generates a control signal 162A for the secondary voltage generator 150A, and controller 160A causes the switch S1 152A to close and the switch S2 154A to be open, such that the input voltage 144A is directed to the shared analog test bus (ATB) 174.

During a second safety check for individual failures at the outputs of the secondary voltage generators 150A-N, the FU-SA controller 180 generates a control signal 162A for the secondary voltage generator 150A and a control signal 164A for the radar circuit 166A. The control signal 164A causes the radar circuit 166A to turn on, such that the secondary voltage generator 150A experiences the same load as during normal operation. The controller 160A causes the switch S1 152A to be open and the switch S2 154A to close, such that the output voltage 158A is directed to the shared ATB 174. The test data from the secondary voltage generator 150A is indicated as test data 168A. Because the first and second safety checks redirect the input voltages 144A-N and the output voltages 158A-N from the secondary voltage generators 150A-N and the radar circuits 166A-N, the first and second safety checks disrupt normal operation of the radar device 100.

The secondary voltage generators 150B-N indicated by the ellipsis in the first set 142A of power domains and the simplified representations in the second set 142B of power domains also include controllers 160B-N and switches S1 152B-N and S2 154B-N, respectively, similar to the controller 160A and switches 152A and 154A shown in the secondary voltage generator 150A and can include LDOs or other kinds of voltage generators than LDOs. The secondary voltage generators 150B-N and radar circuits 166B-N operate similarly to the secondary voltage generator 150A and radar circuit 166A. The control signals 162A-N and 164A-N are provided to the secondary voltage generators 150A-N and the radar circuits 166A-N over a shared control bus 170 from the FU-SA controller 180. The test data 168A-N is provided to the ATB FU-SA circuit 175 over the shared ATB 174. The ATB FU-SA circuit 175 and the FU-SA controller 180 are included in the software-based voltage monitoring system 130B, which is described further herein with respect to FIG. 2.

The ATB FU-SA circuit 175 receives the safety supply voltage Vdd_safety 112 from the safety voltage generator 110 shown in FIG. 1A and includes an analog-to-digital converter (ADC) to convert the analog voltage signals included in the test data 168A-N into digital test data 177 for the FU-SA controller 180. The FU-SA controller 180 receives the digital supply voltage Vdd_digital 127 from the digital voltage generator 125 and the digital test data 177. The FU-SA controller generates the control signals 162A-N and 164A-N for the secondary voltage generators 150A-N and the radar circuits 166A-N, as well as the control signal CTL_ATB 184 for the ATB FU-SA circuit 175.

The FU-SA controller 180 sequentially tests each of secondary voltage generators 150A-N and determines whether any of the input voltages 144A-N or the output voltages 158A-N do not comply with a specified voltage parameter. For example, the FU-SA controller 180 can determine with the input voltages 144A-N or output voltages 158A-N are more than a threshold difference from expected values. In response to determining that any of the input voltages 144A-N and output voltages 158A-N does not comply with the specified voltage parameter, the FU-SA controller 180 generates an error flag 188 and provides it to the system safety controller 190.

The system safety controller 190 receives the digital supply voltage Vdd_digital 127 from the digital voltage generator 125, the flags 138A-C from the HW voltage monitoring system 130A, and the flag 188 from the SW voltage monitoring system 130B. In response to any of the flags 138A-C and 188, the system safety controller 190 can take any available actions to correct the failures and generate a global error flag FLAG_global 195, which can be provided to appropriate circuits in radar device 100 or to an output of the radar device for other systems.

Figure 2:
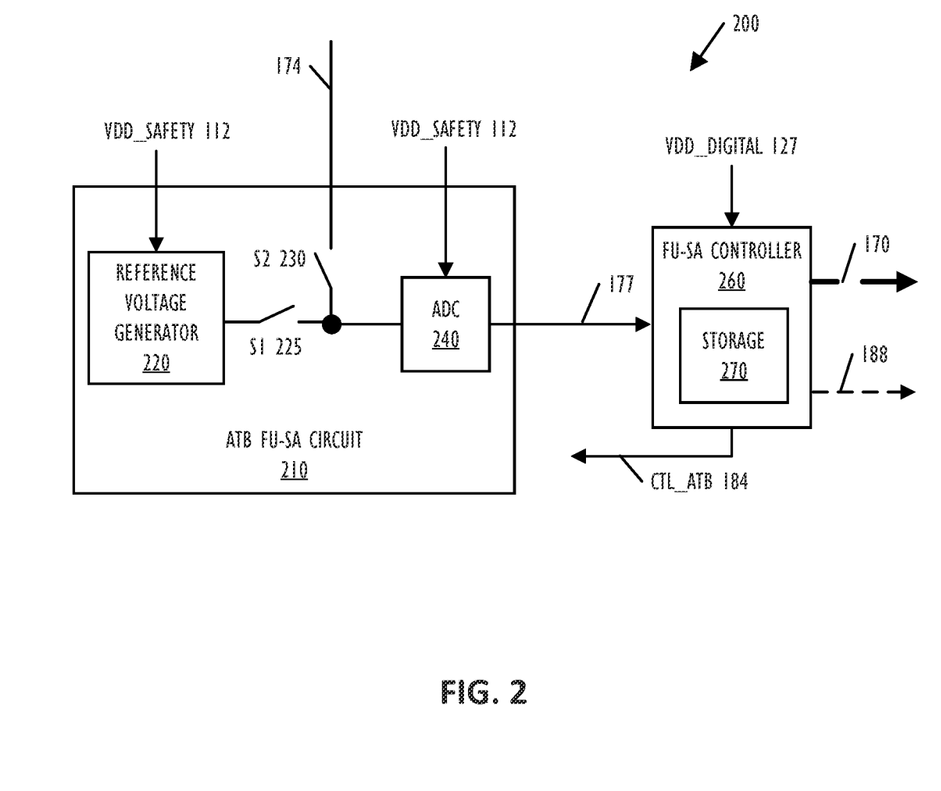
FIG. 2 shows a diagram of an analog-test-bus functional-safety circuit and a functional-safety controller, according to one embodiment.

FIG. 2 shows a diagram of an example SW voltage monitoring system 200 including an ATB FU-SA circuit 210 and a FU-SA controller 260, according to one embodiment. For ease of explanation, the SW voltage monitoring system 200 is described herein with reference to the radar device 100 shown in FIGS. 1A-B. The SW voltage monitoring system 200 can be used instead of the SW voltage monitoring system 130B shown in FIG. 1B. The ATB FU-SA circuit 210 includes a reference voltage generator 220, switches S1 225 and S2 230, and a built-in self-test (BIST) ADC 240. The reference voltage generator 220 receives the safety supply voltage Vdd_safety 112 from the safety voltage generator 110 and outputs a reference voltage to the switch S1 225. The switch S2 230 is coupled to an input of the ATB FU-SA circuit 210 that receives test data 168A-N from the shared ATB 174.

The BIST ADC 240 receives one of the test data 168A-N from the shared ATB 174 and the reference voltage from the reference voltage generator 220 based on the control signal CTL_ATB 184 from the FU-SA controller 260, which indicates which of switch S1 225 and S2 230 is to be open, and which is to be closed. The BIST ADC 240 generates the digital test signals 177 and provides them to the FU-SA controller 260. The FU-SA controller 260 includes a storage 270, which can be any appropriate volatile or non-volatile memory. For example, storage 270 can include a plurality of registers. In this example, storage 270 is included in FU-SA controller 260, but in other implementations, the storage 270 can be independent from the FU-SA controller 260. The FU-SA controller 260 outputs control signals to the shared control bus 170, such as the control signals 162A-N and 164A-N to sequentially test the input voltages 144 and the output voltages 158 from the secondary voltage generators 150A-N.

The ATB FU-SA circuit 210 receives the test data 168 for each of the secondary voltage generators 150A-N over the shared test bus 174 and generates the digital test data 177. The FU-SA controller 260 determines whether the input voltage 144 and output voltage 158 is not in compliance with the specified voltage parameter based on the digital test data 177 from the ATB FU-SA circuit 210. In response to the particular secondary voltage generator 150 not being in compliance with the specified voltage parameter, the FU-SA controller 260 can store an indicator of the particular secondary voltage generator 150 in storage 270 and generate a flag 188.

Figure 3:
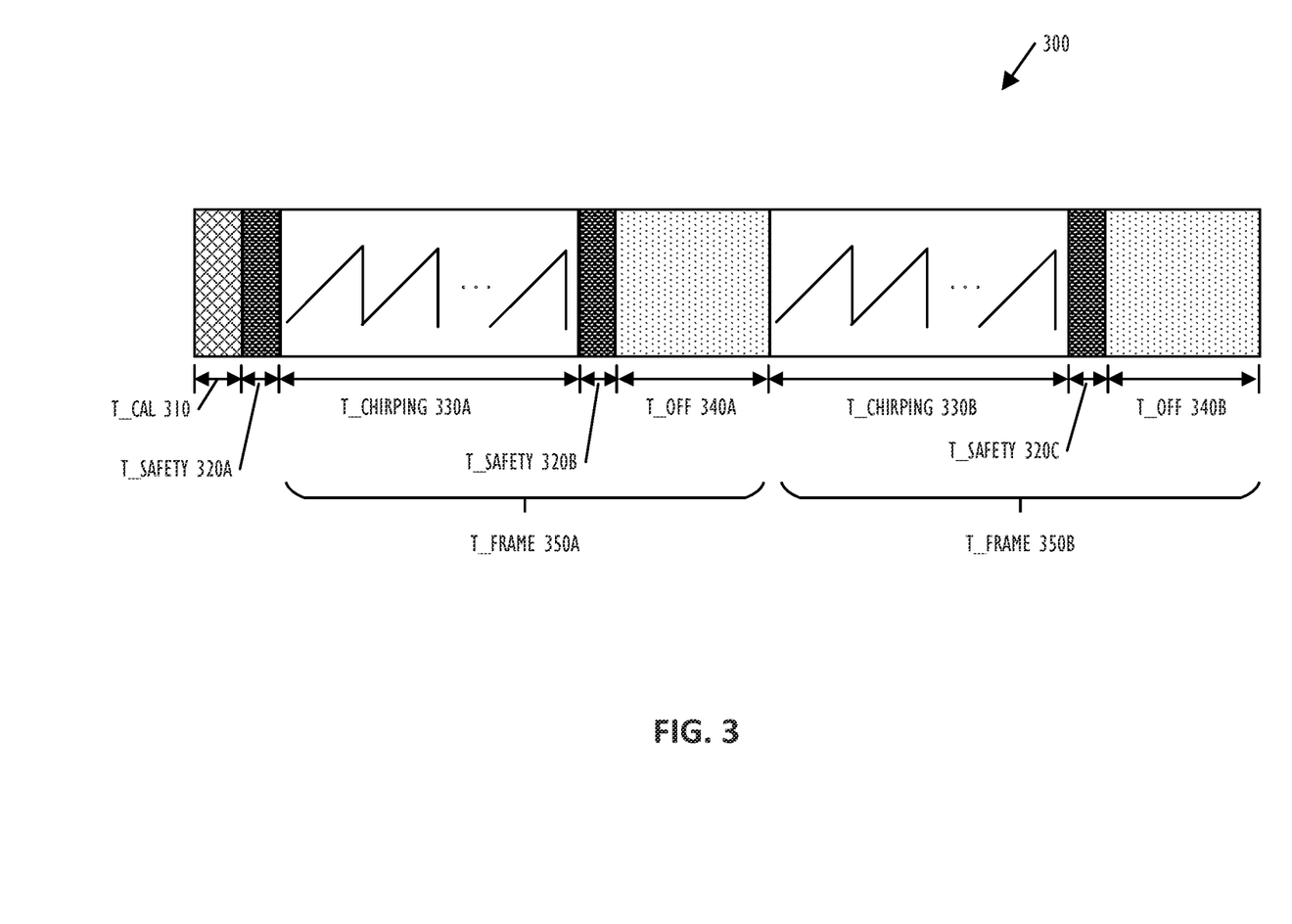
FIG. 3 shows a timing diagram of operations within the example radar device shown in FIGS. 1A-B.

FIG. 3 shows a timing diagram 300 of operations within the example radar device 100 shown in FIGS. 1A-B. For a first period of time T_cal 310, the radar device 100 turns on and performs booting and startup operations, including calibration operations. For example, the radar device 100 can load stored trim values into the appropriate registers. During a second period of time T_safety 320A, the radar device 100 performs a safety check process. For example, the SW voltage monitoring system 130B can perform the first and second safety checks for the input voltages 144A-N and the output voltages 158A-N of the secondary voltage generators 150A-N. The SW voltage monitoring system 130B can also perform other kinds of safety checks during the second time period T_safety 320A, such as receiver linearity and transfer function checks, transmitter to transmitter phase difference checks, and the like.

During a third period of time T_chirping 330A, the radar device 100 transmits and receives chirp signals and performs radar signal processing operations. During the third period of time T_chirping 330A and while the radar device 100 transmits and/or receives a radar chirp frame, the HW voltage monitoring system 130A monitors the safety supply voltage Vdd_safety 112, the primary supply voltage Vdd_primary 117, and the digital supply voltage Vdd_digital 127. After the radar device 100 finishes the third period of time T_chirping 330A, the radar device 100 performs the safety check process again during a fourth period of time T_safety 320B. During a fifth period of time T_off 340A, the radar device 100 powers off some or all of the circuits 166A-N to conserve power.

The radar device 100 powers back on and performs the operations of another radar frame during a sixth period of time T_chirping 330B, such transmitting and/or receiving the second radar chirp frame and processing the radar data. While the radar device 100 transmits and/or receives the second radar chirp frame during T_chirping 330B, the HW voltage monitoring system 130A monitors the safety supply voltage Vdd_safety 112, the primary supply voltage Vdd_primary 117, and the digital supply voltage Vdd_digital 127. After the radar device 100 finishes the sixth period of time T_chirping 330B, the radar device 100 performs the safety check process again during a seventh period of time T_safety 320C. During an eighth period of time T_off 340B, the radar device 100 powers off some or all of the circuits 166A-N to conserve power.

Continuously throughout all of the time periods shown in the timing diagram 300, the HW voltage monitoring system 130A monitors the safety supply voltage Vdd_safety 112, the primary supply voltage Vdd_primary 117, and the digital supply voltage Vdd_digital 127, such that any fault conditions that could cause errors in the supply voltages Vdd_safety 112, Vdd_primary 117, or Vdd_digital 127 are identified quickly and corrective action taken promptly. For example, the radar device 100 is included in a vehicle as part of an automated driving assistance system. In response to identifying an error in one of the supply voltages, the system safety controller 190 can output the flag FLAG_global 195 to an output of the radar device 100, such that the automated driving assistance system does not rely on radar data from the radar device 100 in performing driving assistance operations. In the example timing diagram 300, safety check time periods T_safety 320A-C are included after every chirp frame time period T_chirping 330A-B, but in other implementations, the safety check time periods T_safety 320 can be included after every other chirp frame time period T_chirping 330 or at other intervals between chirp frame time periods T_chirping 330.

Figure 4:
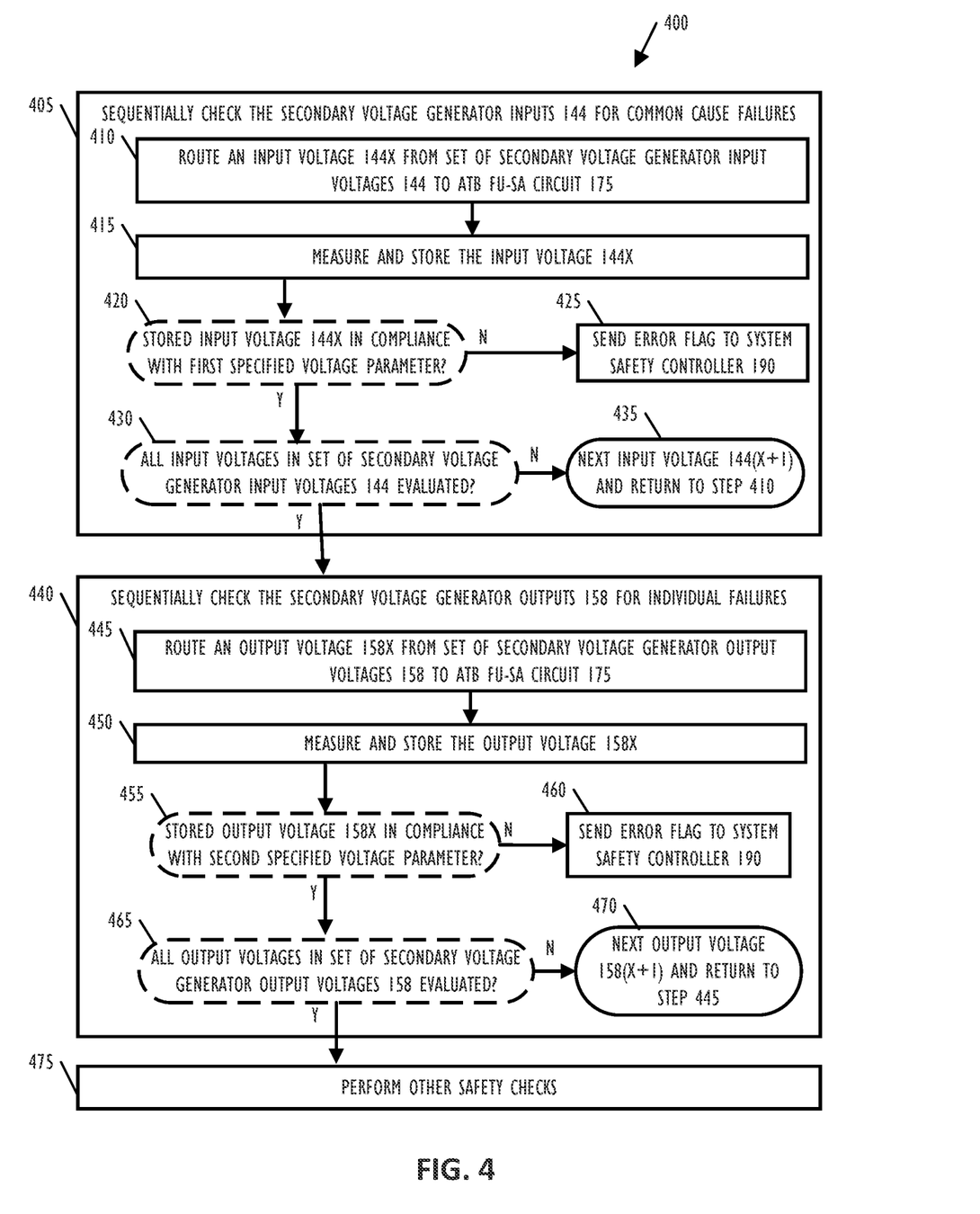
FIG. 4 shows, in flow chart form, an example safety check process, according to one embodiment.

FIG. 4 shows, in flow chart form, an example safety check process 400, according to one embodiment. For example, the safety check process 400 can be performed during the second, fourth, and sixth periods of time T_safety 320A-C in the timing diagram 300 shown in FIG. 3. For ease of explanation, the example safety check process 400 is described herein with respect to the radar device 100 shown in FIGS. 1A-B. The steps of process 400 are shown in a particular order in FIG. 4, but the steps of process 400 may be performed in any order or simultaneously. One or more steps of process 400 can be optional, and process 400 can include additional steps.

The safety check process 400 begins at step 405, at which the SW voltage monitoring system 130B checks the input voltages 144A-N of the secondary voltage generators 150A-N for common cause failures, such as decreases in the input voltages 144A-N due to increases in resistance of the routing lines or solder balls at the inputs 140 and 146 of the radar device 100. The SW voltage monitoring system 130B can check the input voltages 144A-N by polling the power domains. Step 405 includes steps 410, 415, 420, 425, 430, and 435. At step 410, the FU-SA controller 180 routes an input voltage 144 from the set of secondary voltage generator input voltages 144A-N to the ATB FU-SA circuit 175.

For example, the FU-SA controller 180 generates a control signal 162A to cause the switch S1 152A to be closed and switch S2 154A to be open, such that the input voltage 144A is included in the test data 168A from the secondary voltage generator 150A. The FU-SA controller 180 also generates control signals 162B-N and 164A-N to cause the switches S1 152B-N and S2 154B-N to be open and the radar circuits 166A-N to be turned off to conserve power. The test data 168A including the input voltage 144A is provided to the ATB FU-SA circuit 175 over the shared ATB 174.

At step 415, the ATB FU-SA circuit 175 converts the analog test data 168 into digital test data 177, and the FU-SA controller 180 measures and stores the input voltage 144. For example, as described herein with reference to the SW voltage monitoring system 200 shown in FIG. 2, the FU-SA controller 260 stores the input voltage 144 in the storage 270. At step 420, the FU-SA controller 180 determines whether the stored input voltage 144 is in compliance with a first specified voltage parameter. For example, the FU-SA controller 180 can determine whether the stored input voltage 144 is within a threshold difference of a specified voltage value for the input voltage 144. In response to the stored input voltage not being in compliance with the first specified voltage parameter, the process 400 proceeds to step 425, and the FU-SA controller 180 sends an error flag 188 to the system safety controller 190.

In response to the stored input voltage being in compliance with the first specified voltage parameter, the process 400 proceeds to step 430, and the FU-SA controller 180 determines whether all input voltages in the set of secondary voltage generator input voltages 144A-N have been evaluated. In response to determining that not all input voltages 144 have been evaluated, the process 400 proceeds to step 435, and the FU-SA controller 180 determines the next input voltage 144 and returns to step 410 to evaluate the next input voltage 144. For example, the FU-SA controller 180 determines the next input voltage is the input voltage 144B and returns to step 410 to evaluate the input voltage 144B.

In response to determining that all input voltages 144A-N have been evaluated at step 430, the process 400 proceeds to step 440, at which the SW voltage monitoring system 130B checks the output voltages 158A-N of the secondary voltage generators 150A-N for individual failures, such as decreases in an output voltage 158A due to malfunction of the secondary voltage generator 150A, excessive current consumption by the corresponding radar circuit 166A, and the like. For example, faulty bias conditions and reference voltages within the LDO 155A or short circuits due to a bit flip on the LDO control, LDO decoupling capacitance, a defect in an electrostatic discharge protection circuit, and the like can cause malfunctions in the secondary voltage generator 150A. The SW voltage monitoring system 130B can check the output voltages 158A-N by polling the power domains. Step 440 includes steps 445, 450, 455, 460, 465, and 470. At step 445, the FU-SA controller 180 routes an output voltage 158 from the set of secondary voltage generator output voltages 158A-N to the ATB-FU-SA circuit 175.

For example, the FU-SA controller 180 generates a control signal 162A to cause the switch S1 152A to be open and switch S2 154A to be closed, such that the output voltage 158A is included in the test data 168A from the secondary voltage generator 150A. The FU-SA controller 180 also generates a control signal 164A to turn on radar circuit 166A, such that a load on the secondary voltage generator 150A is the same as during normal operation. The FU-SA controller 180 generates control signals 162B-N and 164B-N to cause the switches S1 152B-N and S2 154B-N to be open and the radar circuits 166B-N to be turned off to conserve power. The test data 168A including the output voltage 158A is provided to the ATB FU-SA circuit 175 over the shared ATB 174.

At step 450, the ATB FU-SA circuit 175 converts the analog test data 168 into digital test data 177, and the FU-SA controller 180 measures and stores the output voltage 158. For example, as described herein with reference to the SW voltage monitoring system 200 shown in FIG. 2, the FU-SA controller 260 stores the output voltage 158 in the storage 270. At step 455, the FU-SA controller 180 determines whether the stored output voltage 158 is in compliance with a second specified voltage parameter. For example, the FU-SA controller 180 can determine whether the stored output voltage 158 is within a threshold difference of a specified voltage value for the output voltage 158.

The FU-SA controller 180 can include a plurality of second specified voltage parameters such that a plurality of specified voltage values for the output voltages 158A-N can be evaluated. For example, as described herein with reference to the SW voltage monitoring system 200 shown in FIG. 2, the FU-SA controller 260 can include a second specified voltage parameter for the 0.9V output voltage 158A from the secondary voltage generator 150A and a second specified voltage parameter for the 1.5 V output voltage 158B from the secondary voltage generator 150B in the storage 270. In response to the stored output voltage not being in compliance with the second specified voltage parameter, the process 400 proceeds to step 460, and the FU-SA controller 180 sends an error flag 188 to the system safety controller 190.

In response to the stored output voltage being in compliance with the second specified voltage parameter, the process 400 proceeds to step 465, and the FU-SA controller 180 determines whether all output voltages in the set of secondary voltage generator output voltages 158A-N have been evaluated. In response to determining that not all output voltages 158 have been evaluated, the process 400 proceeds to step 470, and the FU-SA controller 180 determines the next output voltage 158 and returns to step 445 to evaluate the next output voltage 158. For example, the FU-SA controller 180 determines the next output voltage is the output voltage 158B and returns to step 445 to evaluate the output voltage 158B.

In response to determining that all output voltages 158 have been evaluated at step 465, the process proceeds to step 475, and the SW voltage monitoring system 130B can perform other safety checks, such as receiver linearity and transfer function checks, transmitter to transmitter phase difference checks, and other voltage monitoring including bias voltages and bandgap voltages, and the like. The safety check process 400 performed by the SW voltage monitoring system 130B disrupts normal operation of the radar circuits 166A-N, as illustrated in steps 410 and 445 at which the FU-SA controller 180 turns on and off the radar circuits 166A-N. As a result, the safety check process 400 cannot be performed during normal operation of the radar device 100 and instead is performed during specific periods of time, such as the safety check periods of time 320A-C in the timing diagram 300 shown in FIG. 3.

In contrast, the HW voltage monitoring system 130A can continuously monitor the supply voltages Vdd_safety 112, Vdd_primary 117, or Vdd_digital 127, including during normal operation of the radar device 100 because the voltage monitors 134A-C. However, the HW voltage monitoring system 130A occupies considerably more area than the SW voltage monitoring system 130B and can only be used to monitor the supply voltages Vdd_safety 112, Vdd_primary 117, or Vdd_digital 127, whereas the SW voltage monitoring system 130B can be used to monitor the secondary voltage generators 150A-N as well as to perform receiver linearity and transfer function checks, transmitter to transmitter phase difference checks, and other voltage monitoring including bias voltages and bandgap voltages.

Figure 5:
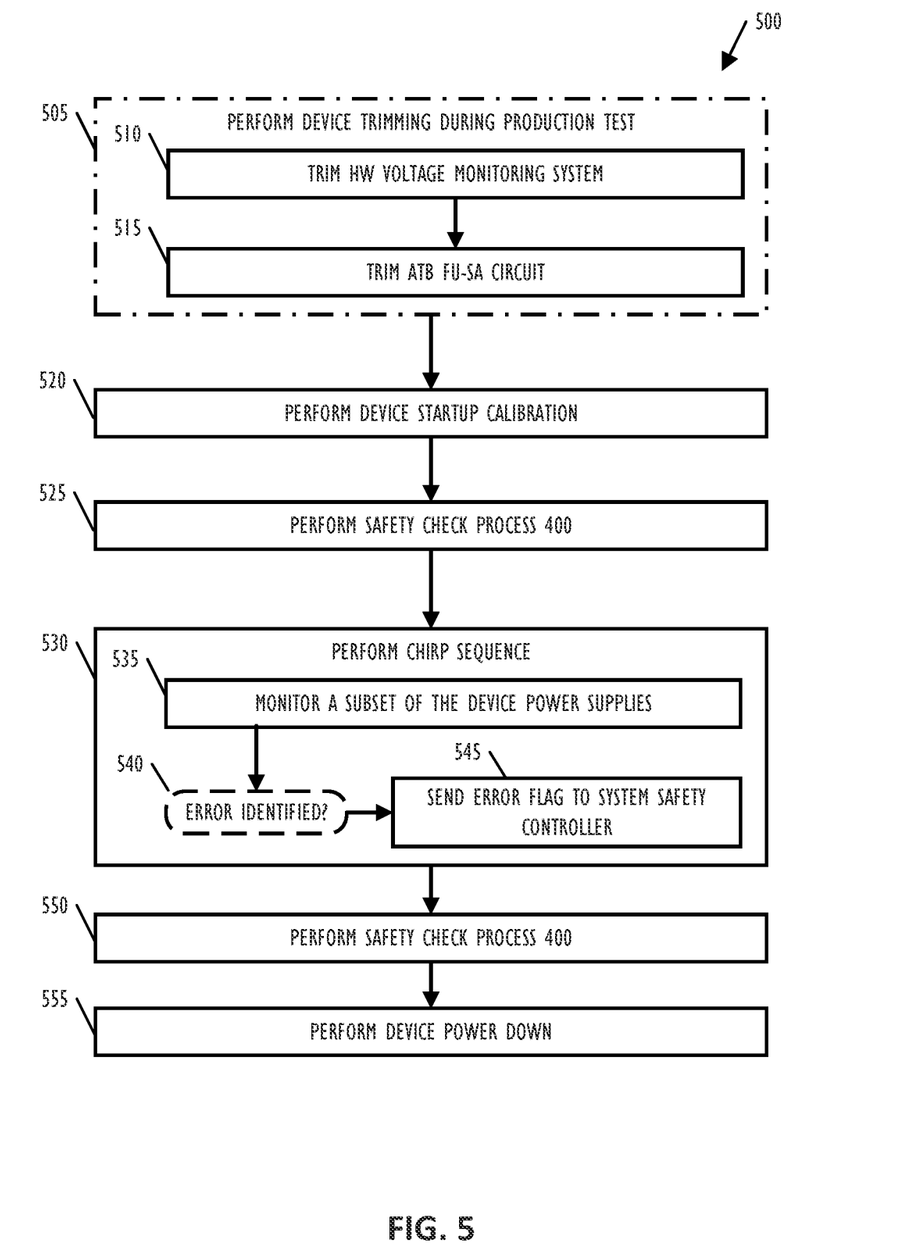
FIG. 5 shows, in flow chart form, an example process for performing operations within the example radar device shown in FIGS. 1A-B, according to one embodiment.

FIG. 5 shows, in flow chart form, an example process 500 for performing operations within the example radar device 100 shown in FIGS. 1A-B, according to one embodiment. For example, the process 500 can be performed during the first time period T_cal 310, the second time period T_safety 320A, the third period of time T_chirping 330A, the fourth period of time T_safety 320B, and the fifth period of time T_off 340A in the timing diagram 300 shown in FIG. 3. For ease of explanation, the example process 500 is described herein with respect to the radar device 100 shown in FIGS. 1A-B. The steps of process 500 are shown in a particular order in FIG. 5, but the steps of process 500 may be performed in any order or simultaneously. One or more steps of process 500 can be optional, and process 500 can include additional steps.

The process can optionally begin at step 505, at which device trimming is performed during a production test, for example by automatic test equipment in the manufacturing process. Step 505 can optionally include steps 510 and 515. At step 510, the automatic test equipment trims the HW voltage monitoring system 130A and stores the trim values, for example in one-time programmable memory. At step 515, the automatic test equipment trims the ATB FU-SA circuit 175 and stores the trim values, for example in one-time programmable memory.

At step 520, the radar device 100 turns on and performs device startup calibration, for example during the time period T_cal 310. The radar device 100 can load the trim values stored in the one-time programmable memory. At step 525, the SW voltage monitoring system 130B performs the safety process check 400 described in FIG. 4, for example during the time period T_safety 320A. At step 530, the radar device 100 performs a chirp sequence. For example, during the time period T_chirping 330A, the radar device 100 operates one or more of radar circuits 166A-N to generate and transmit a sequence of chirp signals and receive reflections, as well as to process the received reflections. While the radar device 100 performs the chirp sequence at step 530, the HW voltage monitoring system 130A continuously monitors a subset of the device power supplies at step 535. The subset of device power supplies can include power supplies necessary for functional safety systems and other critical systems within the radar device 100, such as the supply voltages Vdd_safety 112, Vdd_primary 117, or Vdd_digital 127.

At step 540, the HW voltage monitoring system 130A determines whether an error has been identified, and if so, the HW voltage monitoring system 130A sends an appropriate error flag to the system safety controller 190 at step 545. After the radar device 100 finishes performing the chirp sequence, the process 500 proceeds to step 550, at which the SW voltage monitoring system 130B performs the safety check process 400, for example during the time period T_safety 320B. At step 555, the radar device 100 performs device power down, for example during the time period T_off 340A.

As described herein, the disclosed voltage monitoring system includes a hardware-based voltage monitoring sub-system and a software-based voltage monitoring sub-system. The hardware-based voltage monitoring sub-system can continuously monitor a subset of the device power domains, for example a subset of power domains needed for functional safety circuits and other critical circuits within a radar device. That is, the hardware-based voltage monitoring sub-system can monitor the subset of device power domains without disrupting the normal operation of the radar device. The software-based voltage monitoring sub-system can monitor the remaining device power domains during a specified time period for the safety check by polling the power domains and individually receiving the supply voltages on a shared test bus.

An analog test bus functional safety circuit in the software-based voltage monitoring sub-system digitizes the polled supply voltage and provides the digital data to a functional safety controller in the software-based voltage monitoring sub-system. The functional safety controller determines whether the polled supply voltage is in compliance with a specific voltage parameter and if not, generates an error flag. The analog test bus functional safety circuit and the functional safety controller in the software-based voltage monitoring sub-system can also be used to perform other kinds of safety checks, such as receiver linearity and transfer function checks, transmitter to transmitter phase difference checks, and other voltage monitoring including bias voltages and bandgap voltages.

The hardware-based voltage monitoring sub-system occupies more area than the software-based voltage monitoring sub-system but can monitor the subset of the device power domains without interrupting normal operation of the radar device. The combination of the hardware-based voltage monitoring sub-system and the software-based voltage monitoring sub-system ensures that the supply voltages for device safety are monitored continuously while the power domains not critical for device safety are monitored periodically, and the overall area occupied by the disclosed voltage monitoring system is reduced relative to a voltage monitoring system that includes hardware-based voltage monitors for every power domain in the radar device.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

An integrated circuit includes circuitry for implementing at least one of transmitting and receiving radar chirp frames, a first monitoring system, and a second monitoring system. The circuitry is implemented in a plurality of power domains of the integrated circuit. The first monitoring system monitors supply voltages of a first subset of the plurality of power domains outside of a time window during which a radar chirp frame is transmitted or received utilizing circuitry of the integrated circuit. The first monitoring system includes an output to provide an error signal indicative of a supply voltage of a power domain in the first subset not being in compliance with a first specified voltage parameter. The second monitoring system monitors supply voltages of a second subset of the plurality of power domains during the time window during which radar chirp frames are transmitted or received utilizing circuitry of the integrated circuit. The second monitoring system includes a unique monitoring circuit for each power domain in the second subset, and each unique monitoring circuit includes an output to provide an error signal indicative of a supply voltage of the corresponding power domain not being in compliance with a second specified voltage parameter.

In some implementations and for a sequence of chirp frames being transmitted and received over time, the first monitoring system monitors supply voltages of the first subset between chirp frames in the sequence of chirp frames. In some implementations, the first monitoring system monitors supply voltages of the first subset by polling the power domains of the first subset to individually receive the corresponding supply voltages on a test bus. The first monitoring system can include an analog to digital converter for converting the supply voltages received on the test bus to digital values. In some implementations, the first monitoring system includes a memory for storing the first specified voltage parameter.

In some implementations, the integrated circuit also includes a system safety circuit, which has inputs to receive the error signals from the unique monitoring circuits of the second monitoring system, an input to receive the error signal from the first monitoring system, and an output to provide a global error signal indicative of an error signal from the second monitoring system or an error signal from the first monitoring system. In some implementations, at least one power domain of the second subset includes circuitry of the first monitoring system.

In some implementations, the first monitoring system monitors supply voltages of the first subset according to a safety process. The safety process includes receiving input supply voltages supplied to the power domains of the first subset, determining whether the input supply voltages comply with the first specified voltage parameter, receiving output supply voltages produced by the power domains of the first subset, and determining whether the output supply voltages comply with the first specified voltage parameter. The safety process can further include placing a power domain of the first subset in a loaded condition while the power domain supplies the output supply voltage to the first monitoring system for determining whether the output supply voltage complies with a specified voltage parameter.

An integrated circuit includes circuitry for implementing at least one of transmitting and receiving a radar chirp frame and a voltage supply monitoring system. The circuitry for at least one of transmitting and receiving the radar chirp frame is implemented in a plurality of power domains of the integrated circuits. The voltage supply monitoring system includes a first monitoring sub-system for monitoring supply voltages of a first subset of the plurality of power domains and a second monitoring sub-system for monitoring supply voltages of a second subset of the plurality of power domains. The first monitoring sub-system monitors supply voltages of the first subset outside of a time window during which a radar chirp frame is transmitted or received utilizing circuitry of the integrated circuit. The second monitoring sub-system monitors supply voltages of the second subset including while a radar chirp frame is being transmitted or received utilizing circuitry of the integrated circuit. At least one power domain of the second subset includes circuitry of the voltage supply monitoring system.

In some implementations and for a sequence of chirp frames being transmitted and received, the first monitoring sub-system monitors supply voltages of each power domain of the first subset between chirp frames of the sequence of chirp frames. In some implementations, the first monitoring sub-system monitors supply voltages of the first subset by polling the power domains of the first subset to individually receive a supply voltage on a test bus from the power domain being polled. The first monitoring sub-system can include an analog to digital converter for converting the supply voltages received on the test bus to digital values.

In some implementations, the first monitoring sub-system includes a memory for storing compliance thresholds for comparing with the received supply voltages on the test bus to determine if a received voltage is in compliance. In some implementations, the second monitoring sub-system includes a unique monitoring circuit for each power domain of the second subset, and each unique monitoring circuit includes an output to provide an error signal indicative of a supply voltage of the corresponding power domain not being in compliance with a specified voltage parameter. In some implementations, the first monitoring sub-system includes an output to provide an error signal indicative of a supply voltage of a power domain of the first subset not being in compliance with a specified voltage parameter.

In some implementations, the first monitoring sub-system monitors supply voltages of the first subset according to a safety process, which includes receiving input supply voltages supplied to the power domains of the first subset, determining whether the input supply voltages comply with specified voltage parameters, receiving output supply voltages produced by the power domains of the first subset, and determining whether the output supply voltages comply with specified voltage parameters.

A method includes monitoring, by a first monitoring system of an integrated circuit, supply voltages of a first subset of power domains of the integrated circuit by polling the power domains of the first subset to individually receive a supply voltage on a test bus from the power domain being polled. The integrated circuit includes circuitry for implementing at least one of transmitting and receiving radar chirp frames, and no chirp frames is transmitted or received using the circuitry of the integrated circuit during the monitoring by the first monitoring system. The method continues by transmitting a radar chirp frame and receiving reflections, wherein at least one of the transmitting and receiving utilizes circuitry of the integrated circuit. A second monitoring system of the integrated circuit monitors supply voltages of a second subset of the plurality of power domains during the transmitting and receiving of radar chirp frames and includes a unique monitoring circuit for each power domain of the second subset.

In some implementations, monitoring the supply voltages of the first subset includes receiving input supply voltages supplied to the power domains of the first subset, determining whether the input supply voltages comply with specified voltage parameters, receiving output supply voltages produced by the power domains of the first subset, and determining whether the output supply voltages comply with specified voltage parameters.

In some implementations, monitoring the supply voltage of the first subset includes, for each power domain in the first subset, routing an input supply voltage supplied to the power domain to a shared analog test bus, converting the input supply voltage from the shared analog test bus into digital test input data, and determining whether the digital test input data indicates the input supply voltage is in compliance with a first specified voltage parameter. In response to determining the digital test input data indicates the input supply voltage is not in compliance, an alert is generated. Then, a load is placed on the power domain, and an output supply voltage generated by the power domain is routed to the shared analog test bus. The output supply voltage from the shared analog test bus is converted into digital test output data, and whether the digital test output data indicates the output supply voltage is in compliance with a second specified voltage parameter is determined. In response to determining the digital test output data indicates the output supply voltage is not in compliance, an alert is generated.

The invention claimed is:

1. An integrated circuit comprising:
   circuitry for implementing at least one of transmitting and receiving radar chirp frames, wherein the circuitry is implemented in a plurality of power domains of the integrated circuit;
   a first monitoring system for monitoring supply voltages of a first subset of the plurality of power domains, wherein the first monitoring system monitors supply voltages of the first subset outside of a time window during which a radar chirp frame is transmitted or received utilizing circuitry of the integrated circuit, and wherein the first monitoring system includes an output to provide an error signal indicative of a supply voltage of a power domain in the first subset not being in compliance with a first specified voltage parameter; and a second monitoring system for monitoring supply voltages of a second subset of the plurality of power domains, wherein the second monitoring system includes a unique monitoring circuit for each power domain in the second subset, wherein each unique monitoring circuit includes an output to provide an error signal indicative of a supply voltage of the corresponding power domain not being in compliance with a second specified voltage parameter, wherein the second monitoring system monitors supply voltages of the second subset during the time window during which radar chirp frames are transmitted or received utilizing circuitry of the integrated circuit.

2. The integrated circuit of claim 1, wherein for a sequence of chirp frames being transmitted and received over time, the first monitoring system monitors supply voltages of the first subset between chirp frames in the sequence of chirp frames.

3. The integrated circuit of claim 1, wherein the first monitoring system monitors supply voltages of the first subset by polling the power domains of the first subset to individually receive the corresponding supply voltages on a test bus.

4. The integrated circuit of claim 3, wherein the first monitoring system includes an analog to digital converter for converting the supply voltages received on the test bus to digital values.

5. The integrated circuit of claim 1, wherein the first monitoring system includes a memory for storing the first specified voltage parameter.

6. The integrated circuit of claim 1, further comprising a system safety circuit including:
inputs to receive the error signals from the unique monitoring circuits of the second monitoring system;
an input to receive the error signal from the first monitoring system; and
an output to provide a global error signal indicative of an error signal from the second monitoring system or an error signal from the first monitoring system.

7. The integrated circuit of claim 1, wherein the first monitoring system monitors supply voltages of the first subset according to a safety process, wherein the safety process includes:
receiving input supply voltages supplied to the power domains of the first subset;
determining whether the input supply voltages comply with the first specified voltage parameter;
receiving output supply voltages produced by the power domains of the first subset; and
determining whether the output supply voltages comply with the first specified voltage parameter.

8. The integrated circuit of claim 7, wherein the safety process further includes placing a power domain of the first subset in a loaded condition while the power domain supplies the output supply voltage to the first monitoring system for determining if the output supply voltage complies with the first specified voltage parameter.

9. The integrated circuit of claim 1, wherein at least one power domain of the second subset includes circuitry of the first monitoring system.

10. A method comprising:
monitoring, by a first monitoring system of an integrated circuit, supply voltages of a first subset of a plurality of power domains of the integrated circuit by polling the power domains of the first subset to individually receive a supply voltage on a test bus from the power domain being polled, wherein the integrated circuit includes circuitry for implementing at least one of transmitting and receiving radar chirp frames, wherein no chirp frame is being transmitted or received using the circuitry of the integrated circuit during the monitoring;
transmitting a radar chirp frame and receiving reflections, wherein at least one of the transmitting and receiving utilizes circuitry of the integrated circuit; and
monitoring, by a second monitoring system of the integrated circuit, supply voltages of a second subset of the plurality of power domains, wherein the second monitoring system includes a unique monitoring circuit for each power domain of the second subset, wherein the monitoring supply voltages of the second subset occurs during the transmitting and receiving of radar chirp frames.

11. The method of claim 10, wherein monitoring the supply voltages of the first subset includes:
receiving input supply voltages supplied to the power domains of the first subset;
determining whether the input supply voltages comply with specified voltage parameters;
receiving output supply voltages produced by the power domains of the first subset; and
determining whether the output supply voltages comply with specified voltage parameters.

12. The method of claim 10, wherein monitoring the supply voltage of the first subset includes, for each power domain in the first subset:
routing an input supply voltage supplied to the power domain to a shared analog test bus;
converting the input supply voltage from the shared analog test bus into digital test input data;
determining whether the digital test input data indicates the input supply voltage is in compliance with a first specified voltage parameter;
in response to determining the digital test input data indicates the input supply voltage is not in compliance, generating an alert;
causing a load to be placed on the power domain;
routing an output supply voltage generated by the power domain to the shared analog test bus;
converting the output supply voltage from the shared analog test bus into digital test output data;
determining whether the digital test output data indicates the output supply voltage is in compliance with a second specified voltage parameter; and
in response to determining the digital test output data indicates the output supply voltage is not in compliance, generating an alert.

13. An integrated circuit, comprising:
circuitry for implementing at least one of transmitting and receiving a radar chirp frame, wherein the circuitry is implemented in a plurality of power domains of the integrated circuit; and
a voltage supply monitoring system including:
a first monitoring sub-system for monitoring supply voltages of a first subset of the plurality of power domains, wherein the first monitoring sub-system monitors supply voltages of the first subset outside of a time window during which a radar chirp frame is transmitted or received utilizing circuitry of the integrated circuit; and a second monitoring sub-system for monitoring supply voltages of a second subset of the plurality of power domains including while a radar chirp frame is being transmitted or received utilizing circuitry of the integrated circuit, wherein at least one power domain of the second subset includes circuitry of the voltage supply monitoring system.

14. The integrated circuit of claim 13, wherein for a sequence of chirp frames being transmitted and received, the first monitoring sub-system monitors supply voltages of each power domain of the first subset between chirp frames of the sequence of chirp frames.

15. The integrated circuit of claim 13, wherein the first monitoring sub-system monitors supply voltages of the first subset by polling the power domains of the first subset to individually receive a supply voltage on a test bus from the power domain being polled.

16. The integrated circuit of claim 15, wherein the first monitoring sub-system includes an analog to digital converter for converting the supply voltages received on the test bus to digital values.

17. The integrated circuit of claim 15, wherein the first monitoring sub-system includes a memory for storing compliance thresholds for comparing with the received supply voltages on the test bus to determine if a received voltage is in compliance.

18. The integrated circuit of claim 13, wherein the second monitoring sub-system includes a unique monitoring circuit for each power domain of the second subset, wherein each unique monitoring circuit includes an output to provide an error signal indicative of a supply voltage of the corresponding power domain not being in compliance with a specified voltage parameter.

19. The integrated circuit of claim 13, wherein the first monitoring sub-system includes an output to provide an error signal indicative of a supply voltage of a power domain of the first subset not being in compliance with a specified voltage parameter.

20. The integrated circuit of claim 13, wherein the first monitoring sub-system monitors supply voltages of the first subset according to a safety process, wherein the safety process includes:
receiving input supply voltages supplied to the power domains of the first subset;
determining whether the input supply voltages comply with specified voltage parameters;
receiving output supply voltages produced by the power domains of the first subset; and
determining whether the output supply voltages comply with specified voltage parameters.

* * * * *